(12) United States Patent
Chai et al.

(10) Patent No.: US 12,712,224 B2
(45) Date of Patent: Aug. 18, 2026

(54) BATTERY CELL, BATTERY, ELECTRIC APPARATUS, METHOD AND APPARATUS OF MANUFACTURING BATTERY CELL

(71) Applicant: CONTEMPORARY AMPEREX TECHNOLOGY (HONG KONG) LIMITED, Hong Kong (CN)

(72) Inventors: Zhisheng Chai, Ningde (CN); Kun Fang, Ningde (CN); Qingkui Chi, Ningde (CN); Dongsheng Sun, Ningde (CN); Hui Gu, Ningde (CN); Zhijun Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 588 days.

(21) Appl. No.: 18/320,401

(22) Filed: May 19, 2023

(65) Prior Publication Data

US 2023/0291040 A1 Sep. 14, 2023

Related U.S. Application Data

(63) Continuation of application No. PCT/CN2021/122381, filed on Sep. 30, 2021.

(51) Int. Cl.
*H01M 50/169* (2021.01)
*H01M 10/0585* (2010.01)
(Continued)

(52) U.S. Cl.
CPC ..... *H01M 50/169* (2021.01); *H01M 10/0585* (2013.01); *H01M 50/204* (2021.01);
(Continued)

(58) Field of Classification Search
CPC .................................................. H01M 50/169
See application file for complete search history.

(56) References Cited

U.S. PATENT DOCUMENTS

2006/0204841 A1* 9/2006 Satoh .................. H01M 50/533 29/623.2
2008/0038629 A1* 2/2008 Okabe ................ H01M 10/052 429/121

FOREIGN PATENT DOCUMENTS

CN 1832228 A 9/2006
CN 105261728 A 1/2016
(Continued)

OTHER PUBLICATIONS

The Japan Patent Office (JPO) Notice of Reasons for Refusal for Application No. 2023-520509 Nov. 5, 2024 7 Pages (including translation).

(Continued)

*Primary Examiner* — Brian R Ohara
(74) *Attorney, Agent, or Firm* — ANOVA LAW GROUP, PLLC

(57) ABSTRACT

A battery cell includes a housing, an electrode assembly, an end cover, and a current collecting member. The housing has an opening, the electrode assembly has a tab, the electrode assembly is configured to be accommodated in the housing, the end cover is configured to cover the opening, and the current collecting member is configured to connect the end cover to the tab to implement electrical connection between the end cover and the tab. The current collecting member is welded to the tab to form a first welded portion and a second welded portion, the current collecting member is welded to the end cover to form a third welded portion, the first welded portion is on an inner peripheral side of the third welded
(Continued)

portion, and the second welded portion is on an outer peripheral side of the third welded portion.

20 Claims, 6 Drawing Sheets

(51) Int. Cl.
*H01M 50/204* (2021.01)
*H01M 50/533* (2021.01)
*H01M 50/552* (2021.01)

(52) U.S. Cl.
CPC ....... *H01M 50/533* (2021.01); *H01M 50/552* (2021.01); *H01M 2220/20* (2013.01)

(56) References Cited

FOREIGN PATENT DOCUMENTS

| | | | |
|---|---|---|---|
| CN | 111162205 | A | 5/2020 |
| CN | 112909445 | A | 6/2021 |
| CN | 113300028 | A | 8/2021 |
| CN | 215989122 | U | 3/2022 |
| JP | 2000058024 | A | 2/2000 |
| JP | 2001160388 | A | 6/2001 |
| JP | 2002157992 | A | 5/2002 |
| JP | 2002231216 | A | 8/2002 |
| JP | 2004063231 | A | 2/2004 |
| JP | 2006236967 | A | 9/2006 |
| JP | 2007066604 | A | 3/2007 |
| JP | 2007280743 | A | 10/2007 |
| JP | 2009206024 | A | 9/2009 |
| KR | 20190101122 | A | 8/2019 |
| KR | 20210016827 | A | 2/2021 |
| WO | 2006011645 | A1 | 2/2006 |
| WO | 2021020139 | A1 | 2/2021 |

OTHER PUBLICATIONS

The European Patent Office (EPO) The Communication Pursuant to Article 94(3) EPC for Application No. 21958961.1, May 15, 2025 6 Pages.
The Korean Intellectual Property Office Opinion Submission Notice for Application No. 10-2023-7011764 Jun. 5, 2025 16 Pages (including translation).
State Intellectual Property Office of China Notification to Grant Patent Right for Application No. 202180089880.2, Jun. 26, 2025 6 pages (including translation).
The European Patent Office (EPO) The Extended European Search Report for Applicaton No. 21958961.1, May 15, 2025 6 Pages.
The European Patent Office (EPO) Extended Search Report for EP Application No. 21958961.1, Jul. 4, 2024 6 Pages.
The World Intellectual Property Organization (WIPO) International Search Report for PCT/CN2021/122381 Jun. 27, 2022 5 pages (including English translation).
State Intellectual Property Office of China Notice of Grant of Utility Model Patent Rights for Application No. 202122406641.5, Jan. 21, 2022 2 pages (including translation).
The Japan Patent Office (JPO) Notification of Reasons for Refusal for Application No. 2023-520509 Jun. 4, 2024 6 Pages (including translation).
The World Intellectual Property Organization (WIPO) Written Opinion for PCT/CN2021/122381 Jun. 27, 2022 9 Pages (including translation).

* cited by examiner

BATTERY CELL, BATTERY, ELECTRIC APPARATUS, METHOD AND APPARATUS OF MANUFACTURING BATTERY CELL

CROSS-REFERENCE TO RELATED APPLICATION

This application is a continuation of International Application No. PCT/CN2021/122381, filed on Sep. 30, 2021, the entire content of which is incorporated herein by reference.

TECHNICAL FIELD

This application relates to the field of battery technologies, and specifically, to a battery cell, a battery, an electric apparatus, a manufacturing method of battery cell, and a manufacturing apparatus of battery cell.

BACKGROUND

Energy conservation and emission reduction are critical to sustainable development of the automobile industry. Electric vehicles, with their advantages in energy conservation and emission reduction, have become an important part of sustainable development of the automobile industry. For electric vehicles, battery technology is an important factor in connection with their development.

In the battery technology, both safety performance and service life of battery cells need to be considered. Therefore, how to prolong the service life of the battery cells is an urgent problem that needs to be solved in the battery technology.

SUMMARY

Embodiments of this application provide a battery cell, a battery, an electric apparatus, a manufacturing method of battery cell, and a manufacturing apparatus of battery cell to effectively prolong service life of the battery cell.

According to a first aspect, an embodiment of this application provides a battery cell, including: a housing with an opening; an electrode assembly with tabs, where the electrode assembly is accommodated in the housing; an end cover, configured to cover the opening; and a current collecting member, configured to connect the end cover to the tab to implement electrical connection between the end cover and the tab, where the current collecting member is welded to the tab to form a first welded portion and a second welded portion, the current collecting member is welded to the end cover to form a third welded portion, the first welded portion is on an inner peripheral side of the third welded portion, and the second welded portion is on an outer peripheral side of the third welded portion.

In the foregoing technical solution, the current collecting member is welded to the tab to form the first welded portion and the second welded portion, and the current collecting member is welded to the end cover to form the third welded portion. The first welded portion and the second welded portion are respectively on the inner peripheral side and an outer peripheral side of the third welded portion, so that electrons in the inner ring part of the electrode assembly can move along a path passing the tab, the first welded portion, the current collecting member, the third welded portion, and the end cover, and electrons in the outer ring part of the electrode assembly can move along a path passing the tab, the second welded portion, the current collecting member, the third welded portion, and the end cover, which equalizes the movement paths of the electrons in the inner ring part and the outer ring part of the electrode assembly, thereby reducing internal resistance of the battery cell and effectively prolong service life of the battery cell.

In some embodiments, the current collecting member includes: a body portion, configured to abut against and be welded to the tab to form the first welded portion and the second welded portion; and a convex portion, protruding from an outer surface of the body portion in a direction toward the end cover, where the convex portion is configured to abut against and be welded to the end cover to form the third welded portion.

In the foregoing technical solution, the body portion is a part of the current collecting member that is welded to the tab, and the convex portion is a part of the current collecting member that is welded to the end cover. The convex portion of the current collecting member protrudes from the outer surface of the body portion in the direction toward the end cover, and the convex portion abuts against the end cover to ensure good contact, to facilitate welding of the end cover to the current collecting member.

In some embodiments, the body portion includes: a first connecting portion, connected to the convex portion and being on an inner peripheral side of the convex portion, where the first connecting portion is configured to abut against and be welded to the tab to form the first welded portion; and a second connecting portion, connected to the convex portion and being on an outer peripheral side of the convex portion, where the second connecting portion is configured to abut against and be welded to the tab to form the second welded portion.

In the foregoing technical solution, the first connecting portion of the body portion is on the inner peripheral side of the convex portion, the second connecting portion of the body portion is on the outer peripheral side of the convex portion, and the first connecting portion and the second connecting portion are separated by the convex portion, so that the entire current collecting member forms three welded regions with obvious boundaries, and the three welded regions are regions of the current collecting member that are corresponding to the first connecting portion, the convex portion and the second connecting portion respectively. The first connecting portion and the tab are welded, the second connecting portion and the tab are welded, and the end cover and the convex portion are welded, which can ensure that the first welded portion and the second welded portion are on the inner peripheral side and the outer peripheral side of the third welded portion respectively, thereby improving efficiency of welding the current collecting member and the tab and efficiency of welding the end cover and the current collecting member and improving productivity.

In some embodiments, an outer surface of the first connecting portion and an inner peripheral face of the convex portion jointly form a first escape portion, and the first escape portion is configured to avoid the first welded portion; and an outer surface of the second connecting portion and an outer peripheral face of the convex portion jointly form a second escape portion, and the second escape portion is configured to avoid the second welded portion.

In the foregoing technical solution, the outer surface of the first connecting portion and an inner peripheral face of the convex portion jointly form the first escape portion configured to avoid the first welded portion, thereby ensuring good contact between the convex portion and the end cover. The outer surface of the second connecting portion and an outer peripheral face of the convex portion jointly form the second escape portion configured to avoid the second welded portion, thereby ensuring good contact between the convex portion and the end cover.

In some embodiments, a concave portion is formed at a position on the current collecting member that is corresponding to the convex portion, and the concave portion is recessed from an inner surface of the body portion in a direction toward the end cover; and the convex portion has a first abutting face for abutting against the end cover, the convex portion has a third connecting portion located between the first abutting face and a bottom face of the concave portion, and the third connecting portion is welded to the end cover to form the third welded portion.

In the foregoing technical solution, the provision of the concave portion of the current collecting member can not only reduce weight of the current collecting member and save materials, but also ensure that the concave portion can avoid the third welded portion, to reduce impact on a welded position of the current collecting member and the tab during welding of the end cover and the convex portion.

In some embodiments, the concave portion is an annular groove.

In the foregoing technical solution, the concave portion is the annular groove, simple in structure and easy to form and manufacture. In welding the end cover and the current collecting member, the end cover and the convex portion may be welded along a circumferential direction of the concave portion, so as to improve firmness of the end cover and the current collecting member after being welding.

In some embodiments, the convex portion is an annular structure.

In the foregoing technical solution, the convex portion is the annular structure, and the end cover may be welded to any position in the circumferential direction of the convex portion, thereby reducing welding difficulty. Certainly, the end cover and the convex portion may alternatively be welded along the circumferential direction of the convex portion, so as to improve firmness of the end cover and the current collecting member after being welded.

In some embodiments, the end cover has a second abutting face, and the current collecting member abuts against the second abutting face and is welded to the end cover to form the third welded portion; and the end cover is provided with a third escape portion and a fourth escape portion that are recessed from the second abutting face in a direction away from the current collecting member, the third escape portion is configured to avoid the first welded portion, and the fourth escape portion is configured to avoid the second welded portion.

In the foregoing technical solution, the end cover is provided with the third escape portion and the fourth escape portion that are recessed from the second abutting face in a direction away from the current collecting member, and therefore, the third escape portion and the fourth escape portion can avoid the first welded portion and the second welded portion respectively, thereby ensuring good contact between the second abutting face and the current collecting member. The third escape portion and the fourth escape portion are provided on the end cover, which can simplify a structure of the current collecting member.

In some embodiments, the current collecting member is a flat plate structure.

In the foregoing technical solution, the current collecting member is a flat plate structure, simple in structure and easy to form and manufacture.

In some embodiments, the end cover includes: a cover body, configured to cover the opening; and a terminal portion, protruding from an outer surface of the cover body in a direction away from the electrode assembly, where the third welded portion is on an outer peripheral side of the terminal portion, and projection of the terminal portion in a thickness direction of the end cover partially or completely covers the first welded portion.

In the foregoing technical solution, the terminal portion of the end cover is configured to be connected to another component, to output electric energy from the battery cell. The third welded portion is on an outer peripheral side of the terminal portion, and a part of the end cover that is welded to the current collecting member is relatively thin in thickness, to ensure firmness of the end cover and the current collecting member after being welded. Projection of the terminal portion in the thickness direction of the end cover partially or completely covers the first welded portion, and therefore, a radial dimension of the terminal portion is larger, which facilitates connection to another component, to output electric energy.

In some embodiments, a welding groove is provided in the end cover, the end cover forms a fourth connecting portion at a bottom of the welding groove, and the fourth connecting portion is configured to be welded to the current collecting member to form the third welded portion.

In the foregoing technical solution, the provision of the welding groove in the end cover reduces a thickness of a part of the end cover that is configured to be welded to the current collecting member and increases a depth of a part of the third welded portion located in the current collecting member, thereby improving firmness of the end cover and the current collecting member after being welded. In addition, a position of the welding groove is the position at which the end cover and the current collecting member are welded, and therefore, when the end cover and the current collecting member are to be welded, a welding position at which the end cover needs to be welded to the current collecting member can be quickly found, thereby improving welding efficiency.

In some embodiments, the first welded portion is an annular structure, or the first welded portion includes a plurality of first welded segments spaced apart in a circumferential direction, and the first welded segment is configured to connect the current collecting member to the tab.

In the foregoing technical solution, the first welded portion is an annular structure, and therefore, the current collecting member and the tab have good firmness after being welded, and a larger current flowing area is obtained. The first welded portion includes a plurality of first welded segments spaced apart in the circumferential direction. The current collecting member and the tab are welded at a plurality of positions in the circumferential direction, so that one first welded segment is correspondingly formed at each position, thereby ensuring that the current collecting member and the tab have good firmness after being welded while efficiency of welding the current collecting member and the tab is improved.

In some embodiments, the second welded portion is an annular structure, or the second welded portion includes a plurality of second welded segments spaced apart in a circumferential direction, and the second welded segment is configured to connect the current collecting member to the tab.

In the foregoing technical solution, the second welded portion is an annular structure, and therefore, the current collecting member and the tab have good firmness after being welded, and a larger current flowing area is obtained. The second welded portion includes a plurality of second welded segments spaced apart in the circumferential direction. The current collecting member and the tab are welded at a plurality of positions in the circumferential direction, so that one second welded segment is correspondingly formed at each position, thereby ensuring that the current collecting member and the tab have good firmness after being welded while efficiency of welding the current collecting member and the tab is improved.

In some embodiments, the third welded portion is an annular structure, or the third welded portion includes a plurality of third welded segments spaced apart in a circumferential direction, and the third welded segment is configured to connect the current collecting member to the end cover.

In the foregoing technical solution, the third welded portion is an annular structure, and therefore, the end cover and the current collecting member have good firmness after being welded, and a larger current flowing area is obtained. The third welded portion includes a plurality of third welded segments spaced apart in the circumferential direction. The end cover and the current collecting member are welded at a plurality of positions in the circumferential direction, so that one third welded segment is correspondingly formed at each position, thereby ensuring that the end cover and the current collecting member have good firmness after being welded while efficiency of welding the end cover and the current collecting member is improved.

According to a second aspect, an embodiment of this application provides a battery, including: the battery cell according to any one of the embodiments of the first aspect; and a box, configured to accommodate the battery cell.

According to a third aspect, an embodiment of this application provides an electric apparatus, including the battery according to any one of the embodiments of the second aspect.

According to a fourth aspect, an embodiment of this application provides a manufacturing method of battery cell, and the method includes: providing a housing with an opening; providing an electrode assembly, where the electrode assembly has tabs; providing an end cover; providing a current collecting member; welding the current collecting member to the tab to form a first welded portion and a second welded portion; placing the electrode assembly in the housing; covering the opening with the end cover; and welding the end cover to the current collecting member to form a third welded portion, where the first welded portion is on an inner peripheral side of the third welded portion, and the second welded portion is on an outer peripheral side of the third welded portion.

According to a fifth aspect, an embodiment of this application provides a manufacturing apparatus of battery cell, and the manufacturing apparatus includes: a first providing device, configured to provide a housing with an opening; a second providing device, configured to provide an electrode assembly, where the electrode assembly has tabs; a third providing device, configured to provide an end cover; a fourth providing device, configured to provide a current collecting member; and an assembly device, configured to: weld the current collecting member to the tab to form a first welded portion and a second welded portion; place the electrode assembly in the housing; cover the opening with the end cover; and weld the end cover to the current collecting member to form a third welded portion, where the first welded portion is on an inner peripheral side of the third welded portion, and the second welded portion is on an outer peripheral side of the third welded portion.

BRIEF DESCRIPTION OF DRAWINGS

To describe the technical solutions in the embodiments of this application more clearly, the following briefly describes the accompanying drawings required for describing the embodiments. It should be understood that, the accompanying drawings below only show some embodiments of this application, and therefore, should not be considered as a limitation on the scope. A person of ordinary skills in the art may still derive other related drawings from the accompanying drawings without creative efforts.

Figure 1:
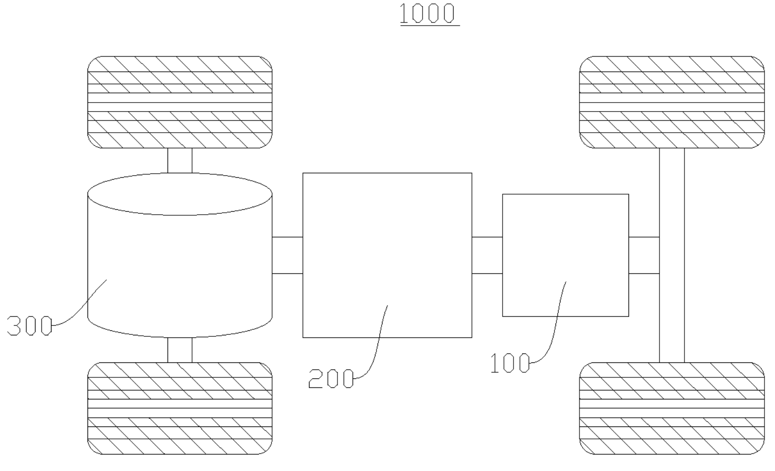
FIG. 1 is a schematic structural diagram of a vehicle according to some embodiments of this application.

Reference signs: 10. box; 11. first portion; 12. second portion; 20. battery cell; 21. housing; 22. electrode assembly; 221. tab; 23. end cover; 231. second abutting face; 232. third escape portion; 233. fourth escape portion; 234. cover body; 235. terminal portion; 236. welding groove; 237. fourth connecting portion; 24. current collecting member; 241. body portion; 2411. first connecting portion; 2412. second connecting portion; 242. convex portion; 2421. first abutting face; 2422. third connecting portion; 243. first escape portion; 244. second escape portion; 245. concave portion; 25. first welded portion 251. first welded segment; 26. second welded portion; 261. second welded segment; 27. third welded portion; 271. third welded segment; 100. battery; 200. controller; 300. motor; 1000. vehicle; 2000. manufacturing apparatus; 2100. first providing device; 2200. second providing device; 2300. third providing device; 2400. fourth providing device; 2500. assembly device; and Z. thickness direction.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by a person of ordinary skills in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms “include”, “comprise”, and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. A person of ordinary skills in the art can understand specific meanings of these terms in this application as appropriate to specific situations.

In the embodiments of this application, the same reference signs denote the same components. For brevity, in different embodiments, detailed descriptions of the same components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

In this application, "a plurality of" means more than two (inclusive).

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The part of negative electrode current collector uncoated with the negative electrode active substance layer protrudes out of the part of negative electrode current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and laminated together, and multiple negative tabs are provided and laminated together. The separator may be made of PP (polypropylene, polypropylene), PE (polyethylene, polyethylene), or the like. In addition, the electrode assembly may be a winding structure or a laminated structure, but the embodiments of this application are not limited thereto.

For the development of battery technology, many design factors need to be considered, for example, performance parameters such as energy density, cycle life, discharge capacity, and charge and discharge rate, as well as safety performance of the battery.

The inventors have found that for a common battery cell, the battery cell is likely to generate heat during a charge and discharge cycle, which affects service life of the battery cell. The inventors have found through further research that in the battery cell, an end cover is directly welded to a tab, to output electric energy through the end cover. However, due to structural limitation of the end cover, a welded portion formed by welding the end cover to the tab (a welding mark portion formed by welding the end cover to the tab) is far from a center of an electrode assembly, and as a result, electrons in an inner ring part of the electrode assembly move a longer path through the welded portion to the end cover, and electrons in an outer ring part of the electrode assembly move a shorter path through the welded portion to the end cover, which increases internal resistance of the battery cell and causes polarization, thereby causing the battery cell to generate a large amount of heat during a charge and discharge process and affecting service life of the battery cell.

In view of this, an embodiment of this application provides a battery cell, the end cover is connected to the tab by using a current collecting member to implement electrical connection between the end cover and the tab; and the current collecting member is welded to the tab to form a first welded portion and a second welded portion, the current collecting member is welded to the end cover to form a third welded portion, the first welded portion is on an inner peripheral side of the third welded portion, and the second welded portion is on an outer peripheral side of the third welded portion, so that the electrons in the inner ring part of the electrode assembly can move along a path passing the tab, the first welded portion, the current collecting member, the third welded portion, and the end cover, and the electrons in the outer ring part of the electrode assembly can move along a path passing the tab, the second welded portion, the current collecting member, the third welded portion, and the end cover, which equalizes movement paths of the electrons in the inner ring part and the outer ring part of the electrode assembly, thereby reducing the internal resistance of the battery cell and effectively prolonging the service life of the battery cell.

The technical solution described in the embodiments of this application is applicable to batteries and electric apparatuses using a battery.

The electric apparatus may be a vehicle, a mobile phone, a portable device, a notebook computer, a ship, a spacecraft, an electric toy, an electric tool, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, and an electric toy airplane. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric apparatus.

For ease of description, the electric apparatus is used as an example of a vehicle for description in the following embodiments.

Referring to FIG. 1, FIG. 1 is a schematic structural diagram of a vehicle 1000 according to some embodiments of this application. The vehicle 1000 is provided with a battery 100 inside, where the battery 100 may be disposed at the bottom, front or rear of the vehicle 1000. The battery 100 may be configured to supply power to the vehicle 1000. For example, the battery 100 may be used as an operational power source for the vehicle 1000.

The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
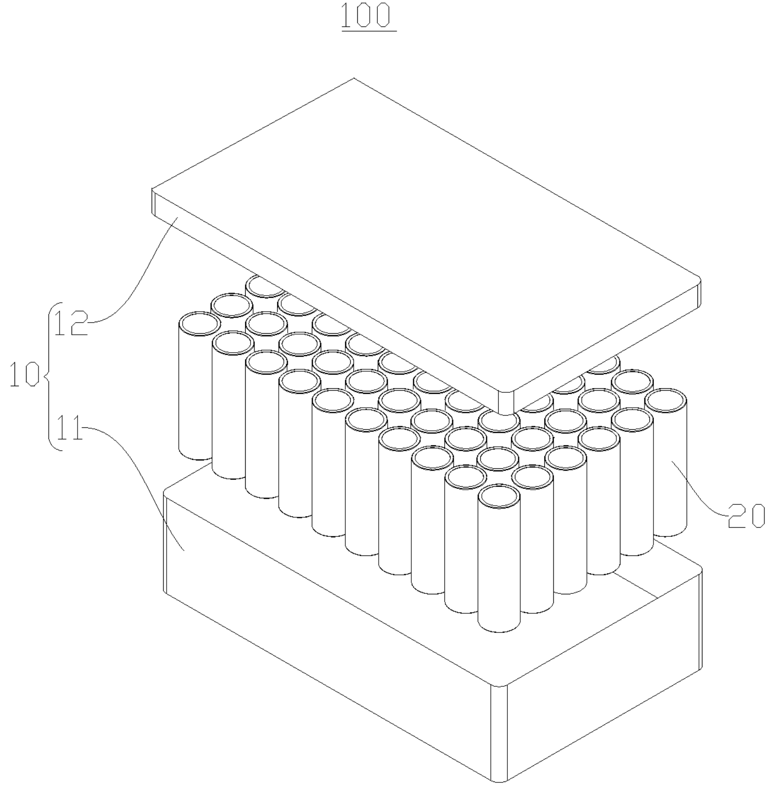
FIG. 2 is a schematic structural diagram of a battery according to some embodiments of this application.

Referring to FIG. 2, FIG. 2 is a schematic structural diagram of a battery 100 according to some embodiments of this application. The battery 100 includes a box 10 and battery cells 20, where the box 10 is configured to accommodate the battery cells 20.

The box 10 is a component for accommodating the battery cells 20, providing an accommodating space for the battery cells 20. The box 10 may be a variety of structures. In some embodiments, the box 10 may include a first portion 11 and a second portion 12. The first portion 11 and the second portion 12 are engaged with each other to jointly define a space for accommodating the battery cells 20. The first portion 11 and the second portion 12 may have a variety of shapes, for example, cuboid, cylinder, or the like. The first portion 11 may be a hollow structure with one side open, and the second portion 12 may also be a hollow structure with one side open, where the open side of the second portion 12 covers the open side of the first portion 11 so as to form a box 10 having an accommodating space. Alternatively, the first portion 11 may be a hollow structure with one side open, and the second portion 12 may be a plate structure, where and the second portion 12 covers the open side of the first portion 11 so as to form a box 10 having an accommodating space. The first portion 11 and the second portion 12 may be sealed by a sealing element, and the sealing element may be a sealing ring, a sealing adhesive, or the like.

In the battery 100, one or a plurality of battery cells 20 may be provided. If a plurality of battery cells 20 are provided, the plurality of battery cells 20 may be connected in series, parallel, or series-parallel, where being connected in series-parallel means a combination of series and parallel connections of the plurality of battery cells 20. The battery module may be first formed by connecting the plurality of battery cells 20 in series, parallel, or series-parallel, and then a plurality of battery modules are connected in series, parallel, or series-parallel to form an entirety which is accommodated in the box 10. It is also possible that all the battery cells 20 are directly connected in series, parallel, or series-parallel to form an entirety which is then accommodated in the box 10.

In some embodiments, the battery 100 may further include a busbar, and the plurality of battery cells 20 may be electrically connected through the busbar, to connect the plurality of battery cells 20 in series, parallel, or series-parallel. The busbar may be a metal conductor such as copper, iron, aluminum, stainless steel, and aluminum alloy.

Figure 3:
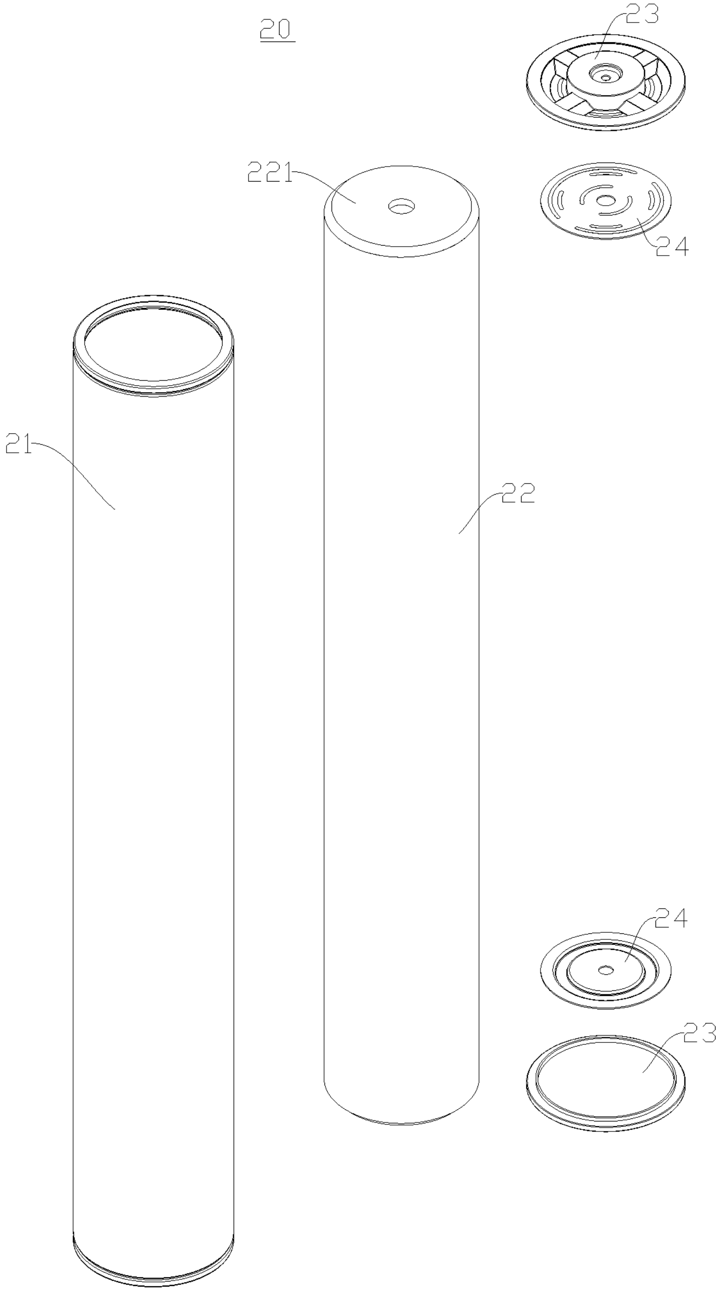
FIG. 3 is an exploded view of a battery cell according to some embodiments of this application.

Referring to FIG. 3, FIG. 3 is an exploded view of a battery cell 20 according to some embodiments of this application. The battery cell 20 includes a housing 21, an electrode assembly 22, an end cover 23, and a current collecting member 24.

The housing 21 is a component for accommodating the electrode assembly 22. The housing 21 may be a hollow structure with an opening at one end, or the housing 21 may be a hollow structure with openings at two opposite ends. If the housing 21 is the hollow structure with an opening at one end, there may be one end cover 23, and the end cover 23 correspondingly covers the opening of the housing 21; or if the housing 21 is the hollow structure with openings at two ends, there may be two end covers 23, and the two end covers 23 cover the openings at the two ends of the housing 21 respectively. The housing 21 may be made of various materials, for example, copper, iron, aluminum, steel, and aluminum alloy. The housing 21 may have various shapes, such as a cylindrical shape and a cuboid shape. For example, in FIG. 3, the housing 21 is a cylinder, and the housing 21 is the hollow structure with openings at two ends.

The electrode assembly 22 is a part at which electrochemical reactions occur in the battery cell 20. The electrode assembly 22 may include a positive electrode plate, a negative electrode plate, and a separator. The electrode assembly 22 may be a winding structure formed by winding the positive electrode plate, the separator, and the negative electrode plate, or may be a laminated structure formed by laminating the positive electrode plate, the separator, and the negative electrode plate. The electrode assembly 22 may have various shapes, such as a cylindrical shape and a cuboid shape. If the housing 21 is a cylinder, the electrode assembly 22 may be a cylinder; or if the housing 21 is a cuboid, the electrode assembly 22 may be a cuboid.

The positive electrode plate may include a positive electrode current collector and positive electrode active substance layers applied on two opposite sides of the positive electrode current collector. The negative electrode plate may include a negative electrode current collector and negative electrode active substance layers applied on two opposite sides of the negative electrode current collector. The electrode assembly 22 includes tabs 221, the tabs 221 are classified into a positive tab and a negative tab, the positive tab may be a part of the positive electrode plate that is uncoated with the positive electrode active substance layer, and the negative tab may be a part of the negative electrode plate that is uncoated with the negative electrode active substance layer.

The end cover 23 is a component that covers the opening of the housing 21 to isolate an internal environment of the battery cell 20 from an external environment. The end cover 23 covers the opening of the housing 21, and the shape of the end cover 23 may fit the shape of the housing 21. For example, if the housing 21 is a cuboid structure, the end cover 23 is a rectangular plate-shaped structure that fits the housing 21. For another example, as shown in FIG. 3, if the housing 21 is a cylindrical structure, the end cover 23 is a circular plate-shaped structure that fits the housing 21. The end cover 23 may also be made of various materials, for example, copper, iron, aluminum, steel, and aluminum alloy. The material of the end cover 23 and the material of the housing 21 may be the same or different. In an embodiment in which the battery cell 20 includes two end covers 23, the two end covers 23 may be made of a same material or different materials.

The end cover 23 and the housing 21 may be sealed by using a sealing member. The end cover 23 may be isolated from the housing 21 by using the sealing member, to insulate the end cover 23 from the housing 21 while sealing the end cover 23 and the housing 21. The sealing member may be made of plastic, rubber, or the like.

The current collecting member 24 is a component for electrically connecting the end cover 23 to the tab 221. There may be one or two current collecting members 24. In an embodiment in which only one end cover 23 is provided in the battery cell 20, there may be one current collecting member 24, and one of the positive tab and the negative tab is connected to one end cover 23 by using one current collecting member 24, and the other is directly connected to the housing 21. In an embodiment in which two end covers 23 are provided in the battery cell 20, there may be two current collecting members 24, and one of the positive tab and the negative tab is connected to one end cover 23 by using one current collecting member 24, and the other is connected to the other end cover 23 by using the other current collecting member 24. The current collecting member 24 may be a metal conductor such as copper, iron, aluminum, steel, and aluminum alloy. In an embodiment in which the battery cell 20 includes two current collecting members 24, materials and structures of the two current collecting members 24 may be the same or different.

Figure 4:
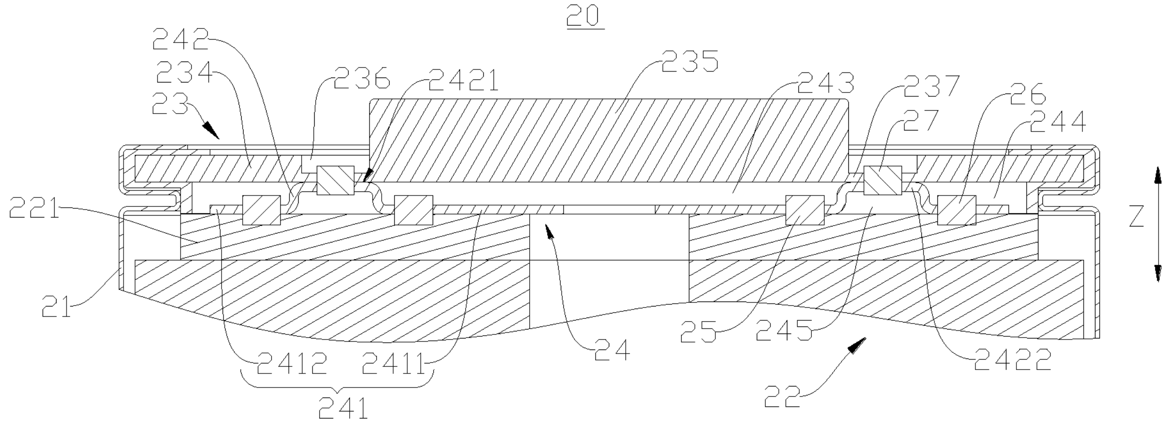
FIG. 4 is a local schematic diagram of a battery cell according to some embodiments of this application.

Referring to FIG. 4, FIG. 4 is a local schematic diagram of a battery cell 20 according to some embodiments of this application. An embodiment of this application provides a battery cell 20, where the battery cell includes a housing 21, an electrode assembly 22, an end cover 23, and a current collecting member 24. The housing 21 has an opening, the electrode assembly 22 has tabs 221, the electrode assembly 22 is configured to be accommodated in the housing 21, the end cover 23 is configured to cover the opening, and the current collecting member 24 is configured to connect the end cover 23 to the tab 221 to implement electrical connection between the end cover 23 and the tab 221. The current collecting member 24 is welded to the tab 221 to form a first welded portion 25 and a second welded portion 26, the current collecting member 24 is welded to the end cover 23 to form a third welded portion 27, the first welded portion 25 is on an inner peripheral side of the third welded portion 27, and the second welded portion 26 is on an outer peripheral side of the third welded portion 27.

The current collecting member 24 is configured to connect the end cover 23 to the tab 221 to implement electrical connection between the end cover 23 and the tab 221. The end cover 23 and the positive tab are connected by using the current collecting member 24, or the end cover 23 and the negative tab are connected by using the current collecting member 24.

The current collecting member 24 and the tab 221 are welded to form the first welded portion 25 and the second welded portion 26. The first welded portion 25 and the second welded portion 26 are both welding mark portions formed by welding the current collecting member 24 to the tab 221, and both the first welded portion 25 and the second welded portion 26 have a function of connecting the current collecting member 24 to the tab 221. The current collecting member 24 and the tab 221 may be welded in various welding methods. For example, the current collecting member 24 and the tab 221 may be welded through keyhole welding, and welding may be performed on an outer side of the current collecting member 24 (side of the current collecting member 24 farther away from the tab), so that the current collecting member 24 and the tab 221 are welded together.

The current collecting member 24 and the end cover 23 are welded to form the third welded portion 27. The third welded portion 27 is a welding mark portion formed by welding the current collecting member 24 to the end cover 23, and the third welded portion 27 has a function of connecting the current collecting member 24 to the end cover 23. The current collecting member 24 and the end cover 23 may be welded in various welding methods. For example, the current collecting member 24 and the end cover 23 may be welded through keyhole welding, and welding may be performed on an outer side of the end cover 23 (side of the end cover 23 farther away from the current collecting member), so that the end cover 23 and the current collecting member 24 are welded together.

The first welded portion 25 is on the inner peripheral side of the third welded portion 27, that is, the third welded portion 27 is on an outer side of the first welded portion 25 in a direction perpendicular to a thickness direction Z of the end cover 23. In other words, the third welded portion 27 is outside an outer peripheral face of the first welded portion 25. The second welded portion 26 is on an outer peripheral side of the third welded portion 27, that is, the second welded portion 26 is on an outer side of the third welded portion 27 in a direction perpendicular to a thickness direction Z of the end cover 23. In other words, the second welded portion 26 is outside an outer peripheral face of the third welded portion 27. That is, in the direction perpendicular to the thickness direction Z of the end cover 23, the first welded portion 25, the third welded portion 27 and the second welded portion 26 are sequentially arranged from inside to outside. The first welded portion 25, the second welded portion 26 and the third welded portion 27 may be arranged coaxially or eccentrically. It should be noted that the first welded portion 25 is on the inner peripheral side of the third welded portion 27, and a position relationship between the first welded portion 25 and the third welded portion 27 is defined herein, but a position relationship between the first welded portion 25 and the third welded portion 27 in the thickness direction Z of the end cover 23 is not limited, that is, there may or may not be a distance between the first welded portion 25 and the third welded portion 27 in the thickness direction Z of the end cover 23. Similarly, the second welded portion 26 is on the outer peripheral side of the third welded portion 27, and a position relationship between the second welded portion 26 and the third welded portion 27 is defined herein, but a position relationship between the second welded portion 26 and the third welded portion 27 in the thickness direction Z of the end cover 23 is not limited, that is, there may or may not be a distance between the second welded portion 26 and the third welded portion 27 in the thickness direction Z of the end cover 23.

The first welded portion 25 may be a closed structure extending along a circumferential direction and connected end to end, for example, the first welded portion 25 is an annular structure. The first welded portion 25 may alternatively be an unclosed structure extending along the circumferential direction with a distance between a head and a tail, for example, the first welded portion 25 is a half-ring structure. Certainly, the first welded portion 25 can alternatively be divided into multiple segments spaced apart along the circumferential direction. The second welded portion 26 may be a closed structure extending along a circumferential direction and connected end to end, for example, the second welded portion 26 is an annular structure. The second welded portion 26 may alternatively be an unclosed structure extending along the circumferential direction with a distance between a head and a tail, for example, the second welded portion 26 is a half-ring structure. Certainly, the second welded portion 26 can alternatively be divided into multiple segments spaced apart along the circumferential direction. The third welded portion 27 may be a closed structure extending along a circumferential direction and connected end to end, for example, the third welded portion 27 is an annular structure. The third welded portion 27 may alternatively be an unclosed structure extending along the circumferential direction with a distance between a head and a tail, for example, the third welded portion 27 is a half-ring structure. Certainly, the third welded portion 27 can alternatively be divided into multiple segments spaced apart along the circumferential direction.

The second welded portion 26 on the outer peripheral side of the third welded portion 27 may have one or more turns. The first welded portion 25 on the inner peripheral side of the third welded portion 27 may have one or more turns.

In the battery cell 20, the tab 221 and the end cover 23 are connected by using the current collecting member 24, and the current collecting member 24 is welded to the tab 221 to form the first welded portion 25 and the second welded portion 26. The current collecting member 24 is welded to the end cover 23 to form the third welded portion 27, and the first welded portion 25 and the second welded portion 26 are respectively on the inner peripheral side and an outer peripheral side of the third welded portion 27, so that electrons in the inner ring part of the electrode assembly 22 can move along a path passing the tab 221, the first welded portion 25, the current collecting member 24, the third welded portion 27, and the end cover 23, and electrons in the outer ring part of the electrode assembly 22 can move along a path passing the tab 221, the second welded portion 26, the current collecting member 24, the third welded portion 27, and the end cover 23. In this way, the movement path of the electrons in the inner ring part and the movement path of the electrons in the outer ring part of the electrode assembly 22 are basically the same, which equalizes the movement paths of the electrons in the inner ring part and the electrons in the outer ring part of the electrode assembly 22, thereby reducing internal resistance of the battery cell 20 and effectively prolonging the service life of the battery cell 20.

In addition, because the current collecting member 24 and the tab 221 are connected by using the first welded portion 25 and the second welded portion 26, both the first welded portion 25 and the second welded portion 26 are capable of passing current, which improves current flowing capability, thereby satisfying a high-rate current flowing need. Because the first welded portion 25 and the second welded portion 26 are on the inner peripheral side and the outer peripheral side of the third welded portion 27 respectively, the first welded portion 25, the second welded portion 26, and the third welded portion 27 are not overlapped in the thickness direction Z of the end cover 23, which reduces a risk of poor welding between the end cover 23 and the current collecting member 24 because the third welded portion 27 is overlapped with the first welded portion 25 or the second welded portion 26.

For a common battery cell 20, the welded portions formed by welding the current collecting member 24 to the tab 221 and the welded portion formed by welding the end cover 23 to the current collecting member 24 are basically located on the same circumference. To prevent the welded portions formed by welding the current collecting member 24 to the tab 221 and the welded portion formed by welding the end cover 23 to the current collecting member 24 from being overlapped in the thickness direction Z of the end cover 23, when the end cover 23 and the current collecting member 24 are to be welded, an accurate welding position needs to be determined, to ensure that the welded portion formed by welding the end cover 23 to the current collecting member 24 and the welded portions formed by welding the current collecting member 24 to the tab 221 are staggered in the circumferential direction, thereby causing low welding efficiency.

However, in the battery cell 20 provided in this embodiment of this application, because the first welded portion 25 is on the inner peripheral side of the third welded portion 27 and the second welded portion 26 is on the outer peripheral side of the third welded portion 27, in an actual welding process, after the current collecting member 24 and the tab 221 are welded to form the first welded portion 25 and the second welded portion 26, the end cover 23 and the current collecting member 24 are welded in a region between the first welded portion 25 and the second welded portion 26. Therefore, the third welded portion 27 may be formed on the outer peripheral side of the first welded portion 25 and on the inner peripheral side of the second welded portion 26, thereby improving efficiency of welding the end cover 23 and the current collecting member 24 and improving production efficiency.

In some embodiments, still referring to FIG. 4, the current collecting member 24 includes a body portion 241 and a convex portion 242. The body portion 241 is configured to abut against and be welded to the tab 221 to form the first welded portion 25 and the second welded portion 26. The convex portion 242 protrudes from an outer surface of the body portion 241 in a direction toward the end cover 23, where the convex portion 242 is configured to abut against and be welded to the end cover 23 to form the third welded portion 27.

The outer surface of the body portion 241 refers to a surface of the body portion 241 facing away from the tab 221. Certainly, the body portion 241 also has an inner surface, and the inner surface of the body portion 241 refers to a surface that is in contact with the tab 221. The body portion 241 may be a plate-shaped structure.

The convex portion 242 protrudes from the outer surface of the body portion 241 in a direction toward the end cover 23. In other words, in the thickness direction Z of the end cover 23, the convex portion 242 extends from the outer surface of the body portion 241 in a direction toward the end cover 23.

In this embodiment, the body portion 241 is a part of the current collecting member 24 that is welded to the tab 221, and the convex portion 242 is a part of the current collecting member 24 that is welded to the end cover 23. The convex portion 242 of the current collecting member 24 protrudes from the outer surface of the body portion 241 in the direction toward the end cover 23, and the convex portion 242 abuts against the end cover 23 to ensure good contact, facilitating welding of the end cover 23 and the current collecting member 24.

In some embodiments, still referring to FIG. 4, the body portion 241 includes a first connecting portion 2411 and a second connecting portion 2412. The first connecting portion 2411 is connected to the convex portion 242 and is on an inner peripheral side of the convex portion 242, where the first connecting portion 2411 is configured to abut against and be welded to the tab 221 to form the first welded portion 25; and the second connecting portion 2412 is connected to the convex portion 242 and is on an outer peripheral side of the convex portion 242, where the second connecting portion 2412 is configured to abut against and be welded to the tab 221 to form the second welded portion 26.

The first connecting portion 2411 is connected to the convex portion 242 and is on an inner peripheral side of the convex portion 242, that is, the first connecting portion 2411 and the convex portion 242 are connected together, and the first connecting portion 2411 is on an inner side of the convex portion 242 in a direction perpendicular to the thickness direction Z of the end cover 23. The second connecting portion 2412 is connected to the convex portion 242 and is on the outer peripheral side of the convex portion 242, that is, the second connecting portion 2412 and the convex portion 242 are connected together, and the second connecting portion 2412 is on an outer side of the convex portion 242 in the direction perpendicular to the thickness direction Z of the end cover 23.

The first connecting portion 2411, the convex portion 242 and the second connecting portion 2412 all may be an integrally formed structure. The first connecting portion 2411 and the second connecting portion 2412 both may be plate-shaped structures.

In this embodiment, the first connecting portion 2411 of the body portion 241 is on the inner peripheral side of the convex portion 242, and the second connecting portion 2412 of the body portion 241 is on the outer peripheral side of the convex portion 242. The first connecting portion 2411 and the second connecting portion 2412 are separated by the convex portion 242, so that the entire current collecting member 24 forms three welded regions with obvious boundaries. The three welded regions are regions of the current collecting member 24 that are corresponding to the first connecting portion 2411, the convex portion 242, and the second connecting portion 2412 respectively. The first connecting portion 2411 and the tab 221 are welded, the second connecting portion 2412 and the tab 221 are welded, and the end cover 23 and the convex portion 242 are welded, which can ensure that the first welded portion 25 and the second welded portion 26 are on the inner peripheral side and the outer peripheral side of the third welded portion 27 respectively, thereby improving efficiency of welding the current collecting member 24 and the tab 221 and efficiency of welding the end cover 23 and the current collecting member 24 and improving productivity.

In some embodiments, still referring to FIG. 4, an outer surface of the first connecting portion 2411 and an inner peripheral face of the convex portion 242 jointly form a first escape portion 243, and the first escape portion 243 is configured to avoid the first welded portion 25; and an outer surface of the second connecting portion 2412 and an outer peripheral face of the convex portion 242 jointly form a second escape portion 244, and the second escape portion 244 is configured to avoid the second welded portion 26.

The outer surface of the first connecting portion 2411 refers to a surface of the first connecting portion 2411 facing away from the tab 221. The outer surface of the second connecting portion 2412 refers to a surface of the second connecting portion 2412 facing away from the tab 221. The convex portion 242 has a first abutting face 2421 for abutting against the end cover 23, the inner peripheral face of the convex portion 242 is a face of the convex portion 242 that is connected between the first abutting face 2421 and the outer surface of the first connecting portion 2411, and the outer peripheral face of the convex portion 242 is a face of the convex portion 242 that is connected between the first abutting face 2421 and the outer surface of the second connecting portion 2412.

The first escape portion 243 has a function of avoiding the first welded portion 25, so that at least part of the first welded portion 25 is accommodated in the first escape portion 243. The first escape portion 243 may be a groove structure recessed from the first abutting face 2421 of the convex portion 242 in a direction away from the end cover 23. The second escape portion 244 has a function of avoiding the second welded portion 26, so that at least part of the second welded portion 26 is accommodated in the second escape portion 244. The second escape portion 244 may also be a groove structure recessed from the first abutting face 2421 of the convex portion 242 in a direction away from the end cover 23.

Because the end cover 23 abuts against the convex portion 242, the end cover 23 encloses the first escape portion 243, and a part of the first welded portion 25 in the first escape portion 243 is formed by the end cover 23 in the first escape portion 243. Even if the first welded portion 25 is partially detached, the first welded portion does not fall into the battery cell 20, so that a risk that performance of the battery cell 20 is affected because the first welded portion 25 is partially detached and falls into the battery cell 20 is less likely to occur.

Because the outer surface of the first connecting portion 2411 and an inner peripheral face of the convex portion 242 jointly form the first escape portion 243 configured to avoid the first welded portion 25, good contact between the convex portion 242 and the end cover 23 is ensured, thereby improving firmness of the end cover 23 and the current collecting member 24 after being welded. Because the outer surface of the second connecting portion 2412 and an outer peripheral face of the convex portion 242 jointly form the second escape portion 244 configured to avoid the second welded portion 26, good contact between the convex portion 242 and the end cover 23 is ensured, thereby improving firmness of the end cover 23 and the current collecting member 24 after being welded.

In some embodiments, still referring to FIG. 4, a concave portion 245 is formed at a position on the current collecting member 24 that is corresponding to the convex portion 242, and the concave portion 245 is recessed from an inner surface of the body portion 241 in a direction toward the end cover 23. The convex portion 242 has a first abutting face 2421 for abutting against the end cover 23, the convex portion 242 has a third connecting portion 2422 located between the first abutting face 2421 and a bottom face of the concave portion 245, and the third connecting portion 2422 is configured to be welded to the end cover 23 to form the third welded portion 27.

The bottom face of the concave portion 245 is a face connected to a side face of the concave portion 245, and the bottom face of the concave portion 245 faces the tab 221 and is spaced apart from the tab 221. The convex portion 242 has a third connecting portion 2422 located between the first abutting face 2421 and a bottom face of the concave portion 245, and the third connecting portion 2422 is a part of the convex portion 242 that is located between the first abutting face 2421 and the bottom face of the concave portion 245. The concave portion 245 may be an annular groove, simple in structure and easy to form and manufacture.

The third connecting portion 2422 may be spaced apart from the first connecting portion 2411 and the second connecting portion 2412 in a thickness direction Z of the end cover 23. The third connecting portion 2422 may have the same plate-shaped structure as the first connecting portion 2411 and the second connecting portion 2412.

The current collecting member 24 may be prepared from a plate-shaped material through stamping. The concave portion 245 is formed by stamping one side of the plate-shaped material while the convex portion 242 is formed at a position on the other side of the plate-shaped material that is corresponding to the concave portion 245.

In this embodiment, the provision of the concave portion 245 of the current collecting member 24 can not only reduce weight of the current collecting member 24 and save materials, but also ensure that the concave portion 245 can avoid the third welded portion 27, to reduce impact on a welded position of the current collecting member 24 and the tab 221 during welding of the end cover 23 and the convex portion 242.

In some embodiments, the convex portion 242 is an annular structure.

In this embodiment, the concave portion 245 may be an annular groove, the second connecting portion 2412 and the third connecting portion 2422 may be annular structures, and the first connecting portion 2411 may be an annular structure or a circular structure.

Because the convex portion 242 is the annular structure, any position in a circumferential direction of the convex portion 242 may be welded to the end cover 23, thereby reducing welding difficulty. Certainly, the end cover 23 and the convex portion 242 may alternatively be welded along the circumferential direction of the convex portion 242, so as to improve firmness of the end cover 23 and the current collecting member 24 after being welded.

Figure 5:
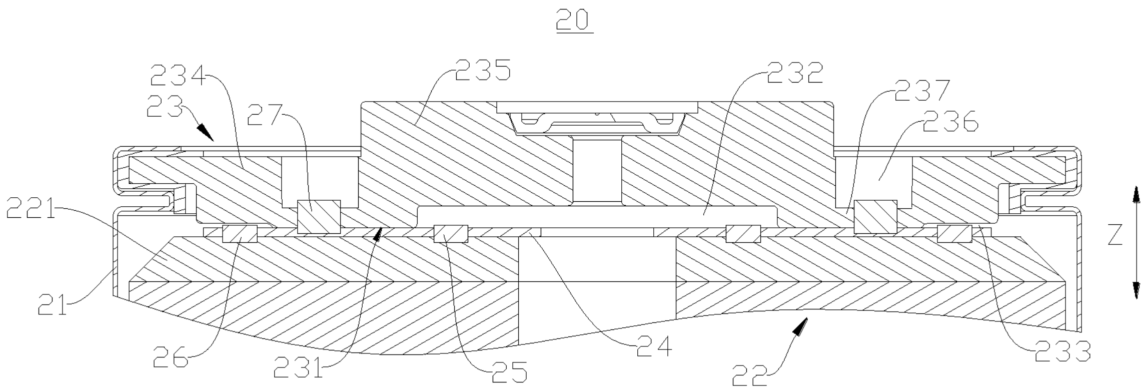
FIG. 5 is a local schematic diagram of a battery cell according to some other embodiments of this application.

In some embodiments, referring to FIG. 5, FIG. 5 is a local schematic diagram of a battery cell 20 according to some other embodiments of this application. The end cover 23 has a second abutting face 231, and the current collecting member 24 abuts against the second abutting face 231 and is welded to the end cover 23 to form the third welded portion 27. The end cover 23 is provided with a third escape portion 232 and a fourth escape portion 233 that are recessed from the second abutting face 231 in a direction away from the current collecting member 24, the third escape portion 232 is configured to avoid the first welded portion 25, and the fourth escape portion 233 is configured to avoid the second welded portion 26.

The third escape portion 232 has a function of avoiding the first welded portion 25, so that at least part of the first welded portion 25 is accommodated in the third escape portion 232. The third escape portion 232 may be a groove structure recessed from the second abutting face 231 in a direction away from the current collecting member 24. The fourth escape portion 233 has a function of avoiding the second welded portion 26, so that at least part of the second welded portion 26 is accommodated in the fourth escape portion 233. The fourth escape portion 233 may alternatively be a groove structure recessed from the second abutting face 231 in a direction away from the current collecting member 24.

It should be noted that when the battery cell 20 is provided with two end covers 23 and two current collecting members 24, structures of the two end covers 23 may be the same or different, and structures of the two current collecting members 24 may be the same or different. For example, one end cover 23 and one current collecting member 24 use a structure shown in FIG. 5 (an escape portion for avoiding the first welded portion 25 and the second welded portion 26 is provided on the end cover 23), and the other end cover 23 and the other current collecting member 24 use a structure shown in FIG. 4 (an escape portion for avoiding the first welded portion 25 and the second welded portion 26 is provided on the current collecting member 24).

Because the end cover 23 is provided with the third escape portion 232 and the fourth escape portion 233 that are recessed from the second abutting face 231 in a direction away from the current collecting member 24, the third escape portion 232 and the fourth escape portion 233 can avoid the first welded portion 25 and the second welded portion 26 respectively, thereby ensuring good contact between the second abutting face 231 and the current collecting member 24. The third escape portion 232 and the fourth escape portion 233 are provided on the end cover 23, which can simplify a structure of the current collecting member 24.

In some embodiments, still referring to FIG. 5, the current collecting member 24 is a flat plate structure.

The current collecting member 24 is the flat plate structure, that is, the current collecting member 24 is a plate-shaped structure with a basically uniform thickness. When an outer surface and an inner surface of the current collecting member 24 are arranged in parallel, the thickness of the current collecting member 24 can be basically uniform.

In this embodiment, the current collecting member 24 is a flat plate structure, simple in structure and easy to form and manufacture.

It should be noted that, in other embodiments, under the condition that the end cover 23 is provided with the third escape portion 232 and the fourth escape portion 233 for avoiding the first welded portion 25 and the second welded portion 26 respectively, the first escape portion 243 and the second escape portion 244 for avoiding the first welded portion 25 and the second welded portion 26 respectively may be provided on the current collecting member 24, so that the entire structure has larger space for avoiding the first welded portion 25 and the second welded portion 26.

In some embodiments, still referring to FIG. 4 and FIG. 5, the end cover 23 includes a cover body 234 and a terminal portion 235, the cover body 234 is configured to cover the opening of the housing 21, and the terminal portion 235 protrudes from an outer surface of the cover body 234 in a direction away from the electrode assembly 22. The third welded portion 27 is on an outer peripheral side of the terminal portion 235, and projection of the terminal portion

235 in a thickness direction Z of the end cover 23 partially or completely covers the first welded portion 25.

The terminal portion 235 is a part of the end cover 23 that is configured to output electric energy from the battery cell 20, and the terminal portion 235 is configured to be connected to another component. For example, the terminal portion 235 is connected to the busbar. The cover body 234 is a part of the end cover 23 that is configured to be connected to the housing 21 and cover the opening of the housing 21. The terminal portion 235 and the cover body 234 may be an integrally formed structure, or may be separate structures connected together. For example, the terminal portion 235 and the cover body 234 are welded. The terminal portion 235 may be at a center of the cover body 234. In an embodiment in which the electrode assembly 22 is a cylindrical structure, the tabs 221 may be annular structures, and the terminal portion 235 and the tabs 221 may be arranged coaxially.

In this embodiment, the third welded portion 27 is on an outer peripheral side of the terminal portion 235, and a part of the end cover 23 that is welded to the current collecting member 24 is relatively thin in thickness, to ensure firmness of the end cover 23 and the current collecting member 24 after being welded. Projection of the terminal portion 235 in a thickness direction Z of the end cover 23 partially or completely covers the first welded portion 25, and therefore, a radial dimension of the terminal portion 235 is larger, which facilitates connection to another component (for example, the busbar), to output electric energy.

For a common battery cell 20 to implement electrical connection between the end cover 23 and the tab 221, the end cover 23 and the tab 221 can be directly welded. However, because a region of the end cover 23 located in the terminal portion 235 is relatively thick, the end cover 23 cannot be welded to the tab 221 in the region of the end cover located in the terminal portion 235. For the end cover 23, only the cover body 234 and the tab 221 can be welded to form a welded portion, the welded portion formed by welding the cover body 234 to the tab 221 can only be on the outer peripheral side of the terminal portion 235, and therefore, the welded portion is farther from the center of the electrode assembly 22, thereby increasing the internal resistance of the battery cell 20. However, in this embodiment, because the end cover 23 and the tab 221 are connected through the current collecting member 24, the position at which the first welded portion 25 is formed by welding the current collecting member 24 to the tab 221 is no longer limited by a structure of the end cover 23. Projection of the terminal portion 235 in a thickness direction Z of the end cover 23 partially or completely covers the first welded portion 25, so that the first welded portion 25 can be closer to the center of the electrode assembly 22, which helps to reduce the internal resistance of the battery cell 20.

In some embodiments, still referring to FIG. 4 and FIG. 5, a welding groove 236 is provided in the end cover 23, the end cover 23 forms a fourth connecting portion 237 at a bottom of the welding groove 236, and the fourth connecting portion 237 is configured to be welded to the current collecting member 24 to form the third welded portion 27.

The fourth connecting portion 237 is a part of the end cover 23 that is welded to the current collecting member 24, and a part from a bottom face of the welding groove 236 to a face of the end cover 23 that abuts against the current collecting member 24 is the fourth connecting portion 237. As shown in FIG. 5, taking the face of the end cover 23 that abuts against the current collecting member 24 as an example of the second abutting face 231, a part from a bottom face of the end cover 23 at the welding groove 236 to the second abutting face 231 is the fourth connecting portion 237. Taking a method of welding the end cover 23 to the current collecting member 24 through keyhole welding as an example, because the fourth connecting portion 237 is relatively thinner than another part of the end cover 23, during welding, it is easier to penetrate the end cover 23 to connect the end cover 23 to the current collecting member 24.

In an embodiment in which the end cover 23 includes the cover body 234 and the terminal portion 235, the welding groove 236 may be recessed from the outer surface of the cover body 234 in a direction facing the electrode assembly 22.

The provision of the welding groove 236 on the end cover 23 reduces a thickness of a part of the end cover 23 that is configured to be welded to the current collecting member 24 and increases a depth of a part of the third welded portion 27 located in the current collecting member 24, thereby improving firmness of the end cover 23 and the current collecting member 24 after being welded. In addition, a position of the welding groove 236 is the position at which the end cover 23 and the current collecting member 24 are welded, and therefore, when the end cover 23 and the current collecting member 24 are to be welded, a welding position at which the end cover 23 needs to be welded to the current collecting member 24 can be quickly found, thereby improving welding efficiency.

Figure 6:
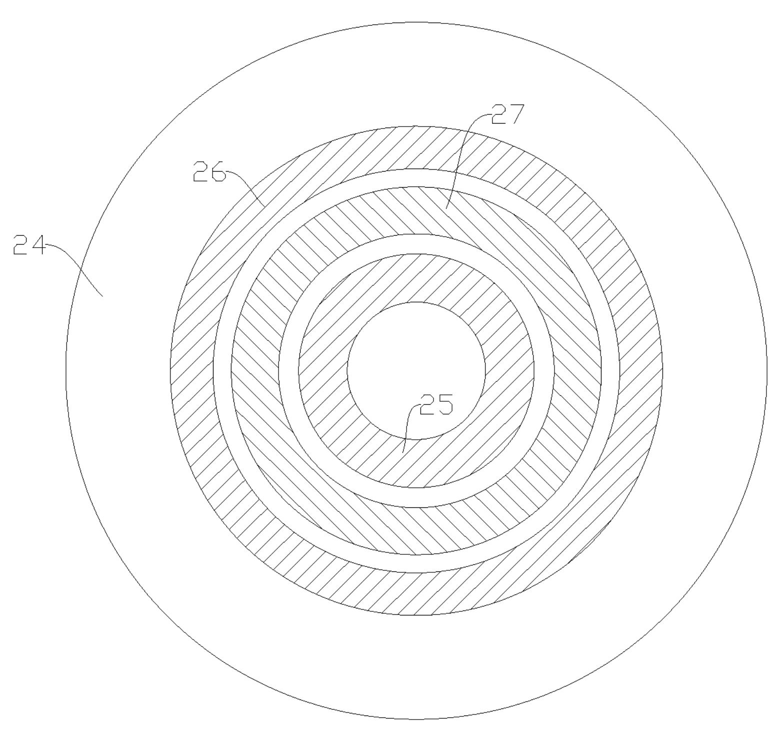
FIG. 6 is a distribution diagram of a first welded portion, a second welded portion, and a third welded portion according to some embodiments of this application.

In some embodiments, referring to FIG. 6, FIG. 6 is a distribution diagram of a first welded portion 25, a second welded portion 26, and a third welded portion 27 according to some embodiments of this application. The first welded portion 25 is an annular structure, and therefore, the current collecting member 24 and the tab 221 have good firmness after being welded, and a larger current flowing area is obtained.

Figure 7:
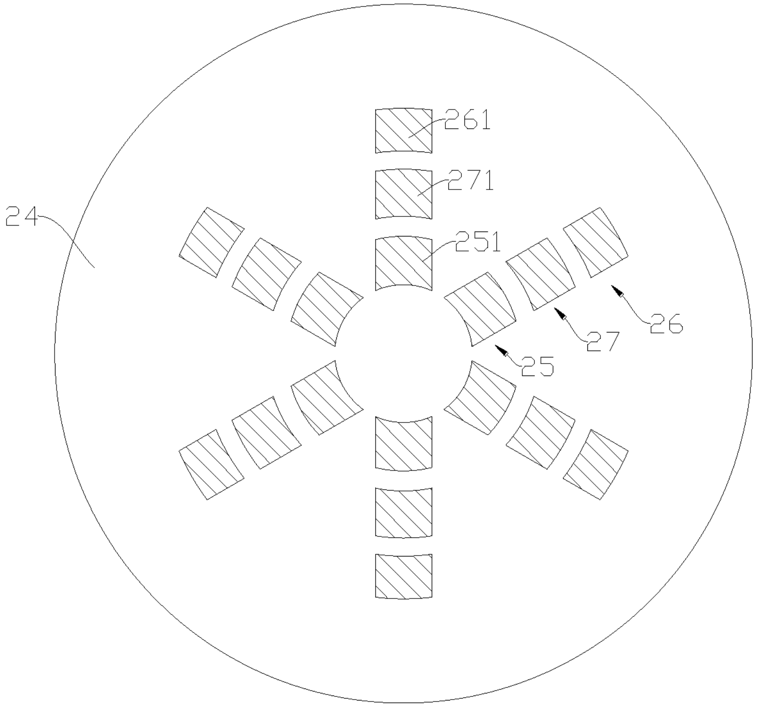
FIG. 7 is a distribution diagram of a first welded portion, a second welded portion, and a third welded portion according to some other embodiments of this application.

In some other embodiments, referring to FIG. 7, FIG. 7 is a distribution diagram of a first welded portion 25, a second welded portion 26, and a third welded portion 27 according to some other embodiments of this application. The first welded portion 25 includes a plurality of first welded segments 251 spaced apart in a circumferential direction, and the first welded segment 251 is configured to connect the current collecting member 24 to the tab 221. The current collecting member 24 and the tab 221 are welded at a plurality of positions in the circumferential direction, so that one first welded segment 251 is correspondingly formed at each position, thereby ensuring that the current collecting member 24 and the tab 221 have good firmness after being welded while efficiency of welding the current collecting member 24 and the tab 221 is improved.

In some embodiments, still referring to FIG. 6, the second welded portion 26 is an annular structure, and therefore, the current collecting member 24 and the tab 221 have good firmness after being welded, and a larger current flowing area is obtained.

In some other embodiments, still referring to FIG. 7, the second welded portion 26 includes a plurality of second welded segments 261 spaced apart in a circumferential direction, and the second welded segment 261 is configured to connect the current collecting member 24 to the tab 221. The current collecting member 24 and the tab 221 are welded at a plurality of positions in the circumferential direction, so that one second welded segment 261 is correspondingly formed at each position, thereby ensuring that the current collecting member 24 and the tab 221 have good firmness after being welded while efficiency of welding the current collecting member 24 and the tab 221 is improved.

In some embodiments, still referring to FIG. 6, the third welded portion 27 is an annular structure, and therefore, the end cover 23 and the current collecting member 24 have good firmness after being welded, and a larger current flowing area is obtained.

For example, in the thickness direction Z of the end cover 23 (not shown in FIG. 6), projection of the third welded portion 27 divides the tab 221 (not shown in FIG. 6) into two parts, and areas of the two parts are equal. In other words, the area of the part of the tab 221 on the inner peripheral side of the third welded portion 27 is equal to the area of the part of the tab 221 on the outer peripheral side of the third welded portion 27.

In some other embodiments, still referring to FIG. 7, the third welded portion 27 includes a plurality of third welded segments 271 spaced apart in a circumferential direction, and the third welded segment 271 is configured to connect the current collecting member 24 to the end cover 23. The end cover 23 and the current collecting member 24 are welded at a plurality of positions in the circumferential direction, so that one third welded segment 271 is correspondingly formed at each position, thereby ensuring that the end cover 23 and the current collecting member 24 have good firmness after being welded while efficiency of welding the end cover 23 and the current collecting member 24 is improved.

An embodiment of this application provides a battery 100, including a box 10 and the battery cells 20 provided in any one of the foregoing embodiments, where the box 10 is configured to accommodate the battery cells 20.

An embodiment of this application provides an electric apparatus, including the battery 100 provided in any one of the foregoing embodiments.

The electric apparatus may be any one of the foregoing apparatuses using the battery 100.

In addition, referring to FIG. 3, an embodiment of this application also provides a cylindrical battery, including a housing 21, an electrode assembly 22, two end covers 23, and two current collecting members 24. The housing 21 has two openings arranged oppositely, the two end covers 23 are configured to cover the two openings respectively, and the electrode assembly 22 is configured to be accommodated in the housing 21. The electrode assembly 22 has two tabs 221 arranged oppositely with opposite polarities, one tab 221 is electrically connected to one end cover 23 by using one current collecting member 24, and the other tab 221 is electrically connected to the other end cover 23 by using the other current collecting member 24. Referring to FIG. 4 and FIG. 5, the current collecting member 24 is welded to the tab 221 to form a first welded portion 25 and a second welded portion 26, the current collecting member 24 is welded to the end cover 23 to form a third welded portion 27, the first welded portion 25 is on an inner peripheral side of the third welded portion 27, and the second welded portion 26 is on an outer peripheral side of the third welded portion 27. The cylindrical battery with such structure has lower internal resistance and longer service life.

Figure 8:
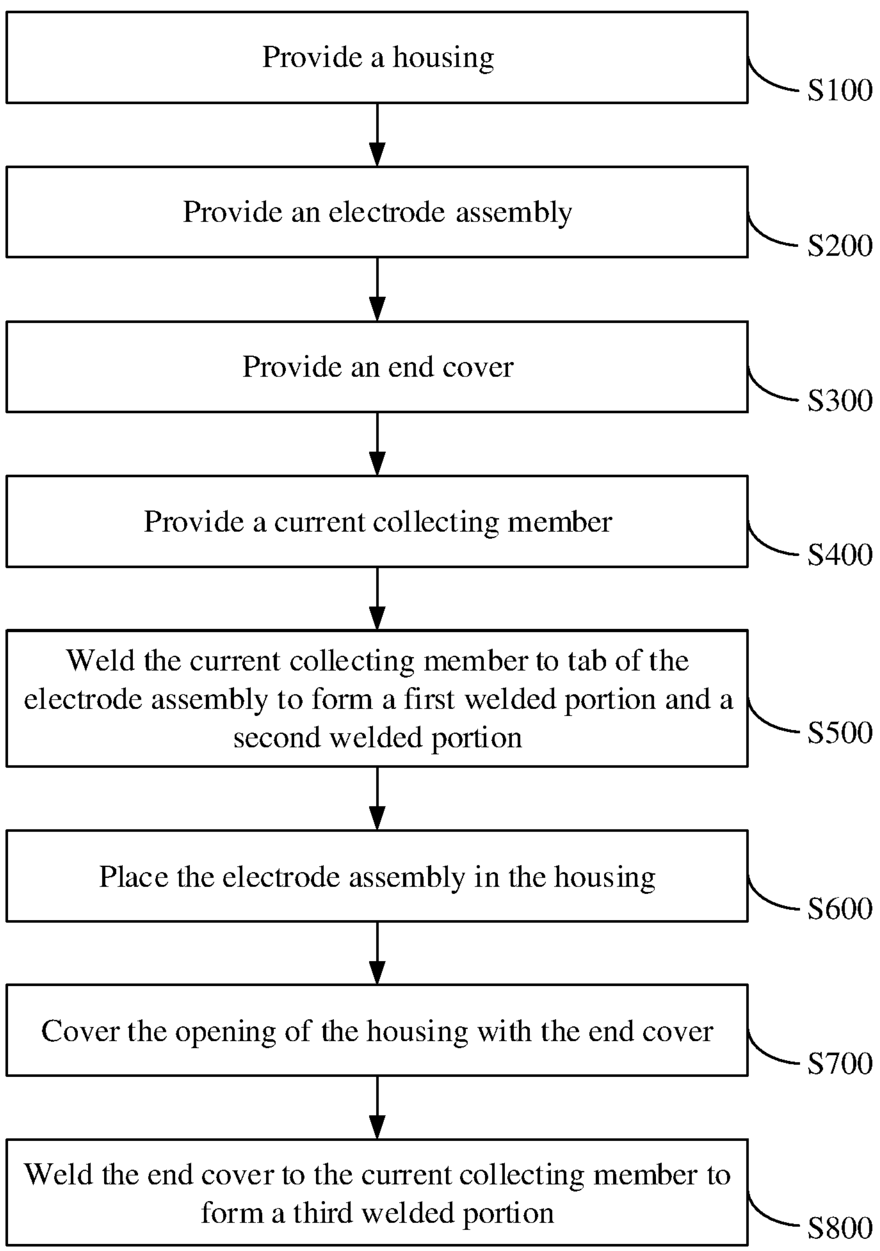
FIG. 8 is a flowchart of a manufacturing method of battery cell according to some embodiments of this application.

An embodiment of this application provides a manufacturing method of battery cell 20. Referring to FIG. 8, FIG. 8 is a flowchart of a manufacturing method of battery cell 20 according to some embodiments of this application. The manufacturing method of battery cell 20 includes:

S100. Provide a housing 21 with an opening.

S200. Provide an electrode assembly 22, where the electrode assembly 22 has tabs 221.

S300. Provide an end cover 23.

S400. Provide a current collecting member 24.

S500. Weld the current collecting member 24 to the tab 221 of the electrode assembly 22 to form a first welded portion 25 and a second welded portion 26.

S600. Place the electrode assembly 22 in the housing 21.

S700. Cover the opening of the housing 21 with the end cover 23.

S800. Weld the end cover 23 to the current collecting member 24 to form a third welded portion 27.

The first welded portion 25 is on an inner peripheral side of the third welded portion 27, and the second welded portion 26 is on an outer peripheral side of the third welded portion 27.

In the foregoing method, a sequence of step S100, step S200, step S300, and step S400 is not limited. For example, step S400 may be performed before step S300, then step S200, and then step S100.

It should be noted that, for related structures of the battery cell 20 manufactured by using the manufacturing method provided in the foregoing embodiments, reference may be made to the battery cell 20 provided in the foregoing embodiments. Details are not described herein again.

Figure 9:
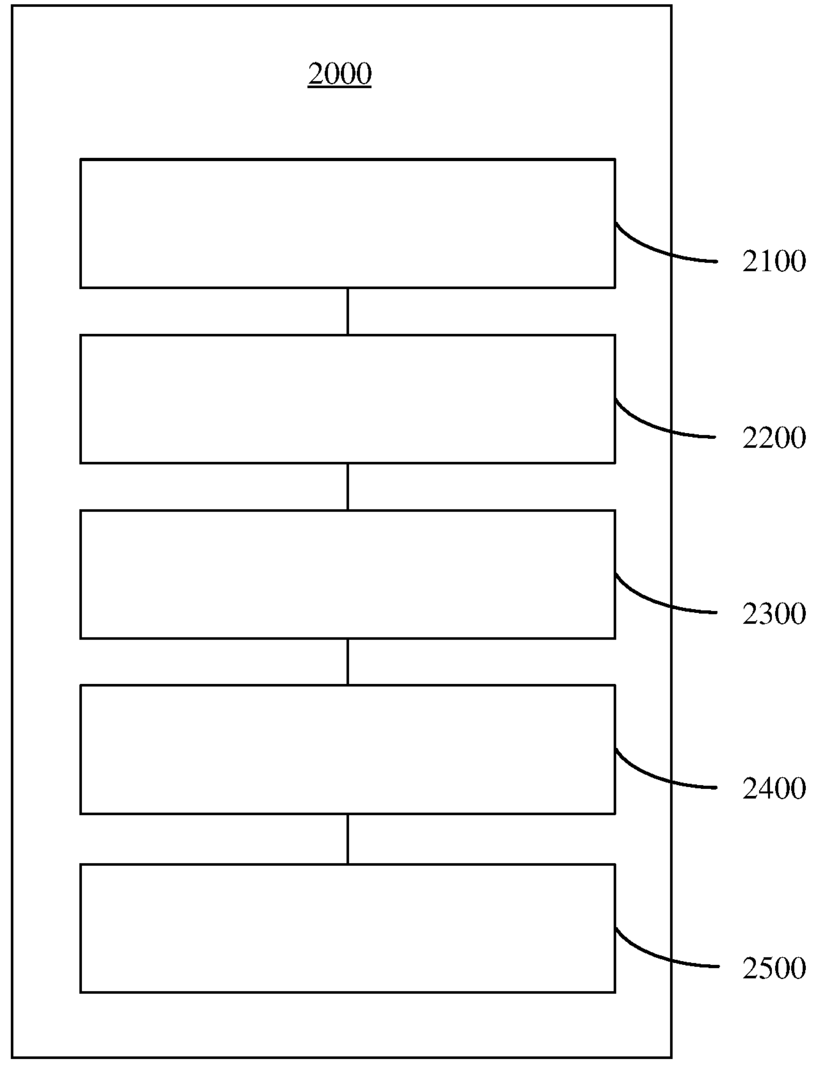
FIG. 9 is a schematic structural diagram of a manufacturing apparatus of battery cell according to some embodiments of this application.

In addition, an embodiment of this application provides a manufacturing apparatus 2000 of battery cell 20. Referring to FIG. 9, FIG. 9 is a schematic structural diagram of a manufacturing apparatus 2000 of battery cell 20 according to some embodiments of this application. The manufacturing apparatus 2000 includes: a first providing device 2100, a second providing device 2200, a third providing device 2300, a fourth providing device 2400, and an assembly device 2500. The first providing device 2100 is configured to provide a housing 21 with an opening. The second providing device 2200 is configured to provide an electrode assembly 22, where the electrode assembly 22 has tabs 221. The third providing device 2300 is configured to provide an end cover 23. The fourth providing device 2400 is configured to provide a current collecting member 24. The assembly device 2500 is configured to weld the current collecting member 24 to the tab 221 to form a first welded portion 25 and a second welded portion 26. The assembly device 2500 is further configured to place the electrode assembly 22 in the housing 21. The assembly device 2500 is further configured to cover the opening with the end cover 23. The assembly device 2500 is further configured to weld the end cover 23 to the current collecting member 24 to form a third welded portion 27. The first welded portion 25 is on an inner peripheral side of the third welded portion 27, and the second welded portion 26 is on an outer peripheral side of the third welded portion 27.

It should be noted that, for related structures of the battery cell 20 manufactured by using the manufacturing apparatus 2000 provided in the foregoing embodiments, reference may be made to the battery cell 20 provided in the foregoing embodiments. Details are not described herein again.

It should be noted that, without conflict, the embodiments and features in the embodiments in this application may be combined with each other.

The foregoing embodiments are only used to describe a technical solution in this application, but are not intended to limit this application. A person skilled in the art understands that this application may have various modifications and variations. Any modifications, equivalent replacements, and improvements made without departing from the spirit and principle of this application shall fall within the protection scope of this application.

What is claimed is:

1. A battery cell, comprising:

a housing with an opening;

an electrode assembly with a tab, wherein the electrode assembly is accommodated in the housing;

an end cover, configured to cover the opening; and a current collecting member, configured to connect the end cover to the tab to implement electrical connection between the end cover and the tab;

wherein the current collecting member is welded to the tab to form a first welded portion and a second welded portion, the current collecting member is welded to the end cover to form a third welded portion, the first welded portion is on an inner peripheral side of the third welded portion, the second welded portion is on an outer peripheral side of the third welded portion, projections of the first welded portion, the second welded portion, and the third welded portion on the end cover are not overlapped with each other along a thickness direction of the end cover, the first welded portion, the third welded portion, and the second welded portion are arranged on the current collecting member in sequence along an extending direction of the current collecting member, and the extending direction of the current collecting member is perpendicular to the thickness direction of the end cover.

2. The battery cell according to claim 1, wherein the current collecting member comprises:

a body portion, configured to abut against and be welded to the tab to form the first welded portion and the second welded portion; and a convex portion, protruding from an outer surface of the body portion in a direction toward the end cover, wherein the convex portion is configured to abut against and be welded to the end cover to form the third welded portion.

3. The battery cell according to claim 2, wherein the body portion comprises:

a first connecting portion, connected to the convex portion and being on an inner peripheral side of the convex portion, wherein the first connecting portion is configured to abut against and be welded to the tab to form the first welded portion; and a second connecting portion, connected to the convex portion and being on an outer peripheral side of the convex portion, wherein the second connecting portion is configured to abut against and be welded to the tab to form the second welded portion.

4. The battery cell according to claim 3, wherein:

an outer surface of the first connecting portion and an inner peripheral face of the convex portion jointly form a first escape portion, and the first escape portion is configured to avoid the first welded portion; and an outer surface of the second connecting portion and an outer peripheral face of the convex portion jointly form a second escape portion, and the second escape portion is configured to avoid the second welded portion.

5. The battery cell according to claim 2, wherein:

a concave portion is formed at a position on the current collecting member that corresponds to the convex portion, and the concave portion is recessed from an inner surface of the body portion in a direction toward the end cover; and the convex portion has an abutting face for abutting against the end cover, the convex portion has a connecting portion located between the abutting face and a bottom face of the concave portion, and the connecting portion is welded to the end cover to form the third welded portion.

6. The battery cell according to claim 5, wherein the concave portion is an annular groove.

7. The battery cell according to claim 2, wherein the convex portion is an annular structure.

8. The battery cell according to claim 1, wherein:

the end cover has an abutting face, and the current collecting member abuts against the abutting face and is welded to the end cover to form the third welded portion; and the end cover is provided with a first escape portion and a second escape portion that are recessed from the abutting face in a direction away from the current collecting member, the first escape portion is configured to avoid the first welded portion, and the second escape portion is configured to avoid the second welded portion.

9. The battery cell according to claim 8, wherein the current collecting member is a flat plate structure.

10. The battery cell according to claim 1, wherein:

the end cover comprises:

a cover body, configured to cover the opening; and a terminal portion, protruding from an outer surface of the cover body in a direction away from the electrode assembly; and the third welded portion is on an outer peripheral side of the terminal portion, and projection of the terminal portion in a thickness direction of the end cover partially or completely covers the first welded portion.

11. The battery cell according to claim 1, wherein a welding groove is provided in the end cover, the end cover forms a connecting portion at a bottom of the welding groove, and the connecting portion is configured to be welded to the current collecting member to form the third welded portion.

12. The battery cell according to claim 1, wherein:

the first welded portion is an annular structure; or the first welded portion comprises a plurality of welded segments spaced apart in a circumferential direction, and the welded segments are configured to connect the current collecting member to the tab.

13. The battery cell according to claim 1, wherein:

the second welded portion is an annular structure; or the second welded portion comprises a plurality of welded segments spaced apart in a circumferential direction, and the welded segments are configured to connect the current collecting member to the tab.

14. The battery cell according to claim 1, wherein:

the third welded portion is an annular structure; or the third welded portion comprises a plurality of welded segments spaced apart in a circumferential direction, and the welded segments are configured to connect the current collecting member to the end cover.

15. A battery, comprising:

the battery cell according to claim 1; and a box, configured to accommodate the battery cell.

16. An electric apparatus, comprising the battery according to claim 15.

17. A manufacturing method of the battery cell according to claim 1, comprising:

providing the housing with the opening;

providing the electrode assembly, wherein the electrode assembly has the tab;

providing the end cover;

providing the current collecting member;

welding the current collecting member to the tab to form the first welded portion and the second welded portion;
placing the electrode assembly in the housing;
covering the opening with the end cover; and
welding the end cover to the current collecting member to form the third welded portion.

18. A manufacturing apparatus of the battery cell according to claim 1, comprising:
a first providing device, configured to provide the housing with the opening;
a second providing device, configured to provide the electrode assembly, wherein the electrode assembly has the tab;
a third providing device, configured to provide the end cover;
a fourth providing device, configured to provide the current collecting member; and
an assembly device, configured to:
weld the current collecting member to the tab to form the first welded portion and the second welded portion;
place the electrode assembly in the housing;
cover the opening with the end cover; and
weld the end cover to the current collecting member to form a third welded portion.

19. A battery cell, comprising:
a housing with an opening;
an electrode assembly with a tab, wherein the electrode assembly is accommodated in the housing;
an end cover, configured to cover the opening; and
a current collecting member, configured to connect the end cover to the tab to implement electrical connection between the end cover and the tab;
wherein:
the current collecting member is welded to the tab to form a first welded portion and a second welded portion, the current collecting member is welded to the end cover to form a third welded portion, the first welded portion is on an inner peripheral side of the third welded portion, and the second welded portion is on an outer peripheral side of the third welded portion;
the current collecting member comprises:
a body portion, configured to abut against and be welded to the tab to form the first welded portion and the second welded portion; and
a convex portion, protruding from an outer surface of the body portion in a direction toward the end cover, wherein the convex portion is configured to abut against and be welded to the end cover to form the third welded portion;
a concave portion is formed at a position on the current collecting member that corresponds to the convex portion, and the concave portion is recessed from an inner surface of the body portion in a direction toward the end cover; and
the convex portion has an abutting face for abutting against the end cover, the convex portion has a connecting portion located between the abutting face and a bottom face of the concave portion, and the connecting portion is welded to the end cover to form the third welded portion.

20. A battery cell, comprising:
a housing with an opening;
an electrode assembly with a tab, wherein the electrode assembly is accommodated in the housing;
an end cover, configured to cover the opening; and
a current collecting member, configured to connect the end cover to the tab to implement electrical connection between the end cover and the tab;
wherein:
the current collecting member is welded to the tab to form a first welded portion and a second welded portion, the current collecting member is welded to the end cover to form a third welded portion, the first welded portion is on an inner peripheral side of the third welded portion, and the second welded portion is on an outer peripheral side of the third welded portion;
the current collecting member comprises:
a body portion, configured to abut against and be welded to the tab to form the first welded portion and the second welded portion; and
a convex portion, protruding from an outer surface of the body portion in a direction toward the end cover, wherein the convex portion is configured to abut against and be welded to the end cover to form the third welded portion; and
the convex portion is an annular structure.

* * * * *